US012334120B2

(12) United States Patent
Viggiano

(10) Patent No.: US 12,334,120 B2
(45) Date of Patent: Jun. 17, 2025

(54) DYNAMICALLY ADJUSTABLE AZIMUTH CONTROL FOR A PHONOGRAPH TONEARM

(71) Applicant: Gregory R. Viggiano, Alexandria, VA (US)

(72) Inventor: Gregory R. Viggiano, Alexandria, VA (US)

( * ) Notice: Subject to any disclaimer, the term of this patent is extended or adjusted under 35 U.S.C. 154(b) by 60 days.

(21) Appl. No.: 18/384,418

(22) Filed: Oct. 27, 2023

(65) Prior Publication Data

US 2024/0144958 A1 May 2, 2024

Related U.S. Application Data

(60) Provisional application No. 63/381,826, filed on Nov. 1, 2022.

(51) Int. Cl.
  *G11B 3/38* (2006.01)
(52) U.S. Cl.
  CPC ..................... *G11B 3/38* (2013.01)
(58) Field of Classification Search
  None
  See application file for complete search history.

(56) References Cited

U.S. PATENT DOCUMENTS

| 1,213,990 | A | * | 1/1917 | Wolcott | G11B 3/70 |
|   |   |   |   |   | 369/201 |
| 3,005,059 | A | * | 10/1961 | Raabe | G11B 3/02 |
|   |   |   |   |   | 369/250 |
| 3,088,742 | A | * | 5/1963 | Alexandrovich | G11B 3/28 |
|   |   |   |   |   | 369/255 |
| 3,926,440 | A | * | 12/1975 | Wren | G11B 3/08 |
|   |   |   |   |   | 369/230 |
| 4,114,894 | A | * | 9/1978 | Pelifian | G11B 3/145 |
|   |   |   |   |   | 369/252 |
| 4,182,517 | A | * | 1/1980 | Rosenberg | G11B 3/12 |
|   |   |   |   |   | 369/247.1 |
| 4,514,836 | A | * | 4/1985 | Kogen | G11B 3/5836 |
|   |   |   |   |   | 369/74 |
| 4,570,253 | A | * | 2/1986 | Firebaugh | G11B 3/18 |
| 2006/0198280 | A1 | * | 9/2006 | Huynh | G11B 3/31 |
| 2023/0360670 | A1 | * | 11/2023 | Braine | G11B 3/145 |

FOREIGN PATENT DOCUMENTS

| GB | 1082246 A | * | 9/1967 | ............ G11B 3/14 |
| GB | 2081488 A | * | 2/1982 | ............ G02B 25/02 |
| GB | 2102655 A | * | 2/1983 | ............ H04R 1/16 |
| NL | 7700039 A | * | 7/1978 | ............ G11B 3/10 |

* cited by examiner

*Primary Examiner* — William J Klimowicz
(74) *Attorney, Agent, or Firm* — Welsh Flaxman & Gitler LLC

(57) ABSTRACT

A phonographic tonearm apparatus including a single filament mechanism for dynamically adjusting the azimuth of the cartridge stylus in real-time during playback of vinyl phonographic records while keeping the tonearm's pivot point in a fixed frictionless position. The tonearm's fixed pivot point provides a rigid and stable position for improved vertical and horizontal tracking performance while allowing for dynamic azimuth adjustment to optimize maximum signal separation of stereo audio channels. The azimuth control apparatus and mechanism also incorporates an integral anti-skate control mechanism that provides dynamic adjustment in real-time during playback of vinyl phonographic records.

13 Claims, 12 Drawing Sheets

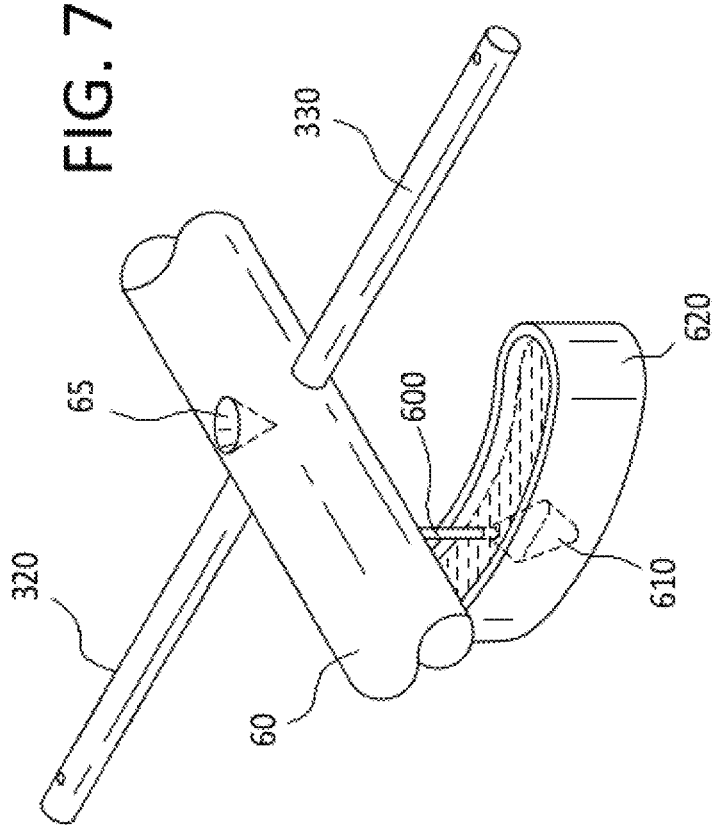

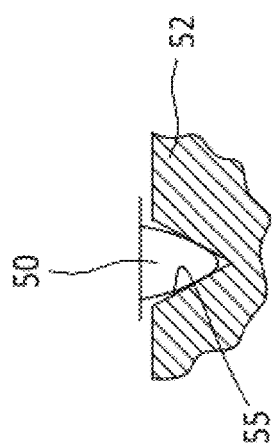

DYNAMICALLY ADJUSTABLE AZIMUTH CONTROL FOR A PHONOGRAPH TONEARM

CROSS-REFERENCE TO RELATED APPLICATION

This application claims priority to U.S. Provisional Patent Application Ser. No. 63/381,826 filed Nov. 1, 2022. The entire content of this application is hereby incorporated by reference herein.

FIELD OF THE INVENTION

The present invention generally relates to tonearm assemblies of the type employed with sound reproduction equipment such as phonographic turntable assemblies and the like. In particular, the present invention is directed to a novel phonographic tonearm adjustment setting mechanism and method for making dynamic adjustments to the tonearm while playing vinyl phonograph records.

BACKGROUND OF THE INVENTION

Audiophile high fidelity sound reproduction equipment has advanced considerably over the last few decades, particularly with vinyl phonographic recording playback equipment. New technology and manufacturing processes has allowed more precision in designing and producing better sound reproduction components and necessitating finer calibrations of these sensitive components for optimum audio performance. This is especially true with phonographic tonearms, cartridges, and sophisticated geometric shapes of the diamond stylus that contact the vinyl record grooves. As new advanced stylus geometries attempt to increase the surface contact area in the record groove, the precise alignment and azimuth positioning of the stylus becomes much more critical for optimum vinyl record playback performance. There is thus a need for an improved means to better adjust the azimuth calibration of a phonographic tonearm in real time as the record is playing so dynamic audio performance improvement can be audibly confirmed while listening to the vinyl record playback.

Conventional unipivot-type tonearm assemblies generally include a single point to balance an elongated arm tube having an intermediate section pivotally attached to a support frame mounted on to the base of a phonograph assembly. A cartridge and stylus is attached to a headshell at one end of the arm tube, with an adjustable counter-balance weight mounted on the opposite end section. By pivotally attaching the arm to the support frame, the stylus is allowed to move freely on both the vertical axis and horizontal axis when tracking a rotating record groove. One of the main inherent design issues associated with unipivot bearing tonearms is the lack of radial axis stability (stylus azimuth position), especially when tracking record grooves with high modulation (ie. very deep bass musical passages). Without complete radial axis stability of the stylus azimuth, the sound reproduction will be greatly compromised, resulting in an audibly obvious acoustic impairment.

High fidelity playback of vinyl phonographic records is highly dependent on correct and accurate adjustment of the tonearm settings for any specific cartridge. These adjustment settings include four interrelated mechanisms: vertical tracking force, vertical tracking angle, anti-skate, and azimuth. When these four mechanisms are optimized relative to each other, the result is very accurate record groove tracking performance.

Being able to dynamically adjust these settings while the record is playing allows for an additional opportunity to fine-tune and audibly re-test the settings for maximum optimization and confirm final results. A variety of methods exist to dynamically adjust the vertical tracking force, vertical tracking angle, and anti-skate settings during vinyl record playback. However, there is no currently available method to accurately adjust the azimuth of the stylus setting on the same plane as the record groove surface while the record is playing—making it impossible for a listener to fine-tune the azimuth setting either by ear or by using electronic testing equipment to measure channel separation and signal strength. As used herein, azimuth is defined as perpendicular position of the stylus to the record groove. This definition assumes that the stylus will be perfectly positioned in the record grooves and the cantilever coil assembly is also in perfect linear alignment. There are several effects of poorly aligned stylus azimuth: high frequency reproduction is impaired; harmonic distortion rises; accurate groove tracking is degraded; and channel separation is reduced. More advanced stylus shapes require increased alignment precision and accuracy because the positioning geometry is more sensitive to error.

Known methods to dynamically adjust the azimuth of the arm tube while the record is playing, given the offset angle of the cartridge, rotating the above mounted arm tube's radial axis will actually introduce a misalignment at the lower position where the stylus contacts the groove. Therefore, rotating the radial axis of the arm tube positioned above an offset mounted cartridge will not provide the correct geometry for high fidelity playback of vinyl phonograph records.

A tonearm design is needed that is easy to use and easy to dynamically adjust and fine-tune all four control settings while playing a vinyl record, such a design would be a significant improvement resulting in less audible distortion, better sound reproduction, reduced stylus/groove wear, and increased channel separation between the left and right signals with increased stereo effect from the loud speakers.

SUMMARY OF THE INVENTION

There is a need for a means to dynamically adjust the azimuth in real-time during playback of vinyl phonographic records in order to provide less audible distortion, better sound reproduction, reduced stylus/groove wear, and increased channel separation between the left and right signals with increased stereo effect from the loud speakers.

Accordingly, it is an object of this invention to provide a phonographic tonearm apparatus including a single filament mechanism for dynamically adjusting the azimuth of the cartridge stylus in real-time during playback of vinyl phonograph records while keeping the tonearm's pivot point in a fixed frictionless position. The tonearm's fixed pivot point provides a rigid and stable position for improved vertical and horizontal tracking performance while allowing for dynamic azimuth adjustment to optimize maximum signal separation of stereo audio channels. The azimuth control apparatus and mechanism also incorporates an integral anti-skate control mechanism that provides dynamic adjustment in real-time during playback of vinyl phonographic records.

It is a further object to provide an improved tonearm apparatus that includes a mechanism and method for dynamically adjusting the stylus azimuth setting while a playing a vinyl phonographic record.

In one aspect, this relates to the tonearm's single bearing arrangement and rigidly positioned pivot point to eliminate linear displacement and coulomb friction while allowing complete freedom of movement along the vertical axis and horizontal axis and improving stylus tracking at low vertical tracking force.

In one aspect, the arm tube itself is made of light thin-wall material to reduce resonance and inertia, preferably tube-shaped and internally damped with a foam or oil-granular material to further reduce undesirable arm resonance in the reproduced sound.

In one aspect, a single filament wound around an upwardly positioned horizontal winding shaft and housing that dynamically controls both the azimuth and anti-skate adjustment settings of the tonearm while playing a record. The filament winding shaft housing is pushed upward by means of a lower positioned internal spring damped in a heavy-weight silicone-type fluid, and where the upward force of lower positioned internal spring creates the tension to keep the tone arm assembly upwardly connected to the pivot point. Each end of the filament is attached to the outer sides of the right and left lower transverse crossbars. The transverse crossbars are rigidly and perpendicularly connected to the tonearm at the single rigid pivot point allowing for complete vertical and horizontal freedom of travel. The filament, comprised of a flexible wire of sufficient gauge; such as tungsten wire, will provide an additional path for transferring detrimental mechanical energy generated by the cartridge cantilever modulation away from the arm tube. This energy transfer path will also reduce or eliminate any potential standing waves in the arm tube assembly.

In one aspect, freedom of travel of the tonearm assembly and cartridge about the vertical axis and horizontal axis for tracking the record grooves radially inward is provided by the single pivot point and filament connection. When turned, the upwardly positioned horizontal winding shaft adjusts the length and position of the filament connected to the two lower crossbars. The change in position of the crossbars rotates the tonearm connecting rod about its radial axis and correspondingly changes the azimuth position of the stylus in relation to the record groove—as the connecting rod is on the same horizontal plane as the stylus in the record groove.

In one aspect, the radial axis orientation is precisely changed on the same planar surface of the record groove while keeping the vertical axis and horizontal axis in fixed positions, to preserve the geometric integrity at the exact location where the stylus tracks the groove surface.

In one aspect, to provide the correct geometry for adjusting the azimuth of the stylus in the record groove, the radial axis of the stylus, not the above positioned arm tube, is adjustable for optimal high fidelity playback of vinyl phonograph records.

In one aspect, the azimuth setting is determined by the position of the stylus in the groove. Optimal azimuth setting is achieved by rotating the stylus along its longitudinal axis until signal separation between channels is at a maximum. Depending on the coil/cantilever assembly construction type, cartridge manufacturers typically allow between 1.5° to 3.0° tolerance for the coil alignment on the cantilever. Effectively, the cartridge/headshell may need to be adjusted by 3° off-level in order to get the best possible performance. The longitudinal angle geometry of the arm tube can be used to damp resonance and help correct for any misalignment in the offset angle of the headshell.

In one aspect, the arm-pivot bearing arrangement allows a mechanism to make dynamic adjustments to the tonearm's azimuth setting while playing a vinyl phonograph record.

In one aspect, a single flexible filament is connected to the upper winding post and lower positioned tonearm assembly.

In one aspect, no more than a single flexible filament is used.

In one aspect, the single flexible filament is tungsten or similarly hard metallic material, to eliminate stretching, material fatigue, and environmental sensitivity.

In one aspect, a single filament is used of sufficient gauge and flexibility to permit free and frictionless vinyl phonograph record groove tracking about the vertical axis and horizontal axis and permit a transfer exit path for detrimental mechanical energy and potential standing waves generated by cartridge modulation along the tonearm tube.

In one aspect, the single flexible filament is wound around a horizontally mounted adjustable winding post in above vertical alignment with the lower pivot point bearing of the tonearm assembly.

In one aspect, the single flexible filament is wound around the winding post and threaded through a mid-positioned eyelet, keeping an equal amount of filament windings on each side of the eyelet.

In one aspect, the amount of the windings creates a horizontal separation and skewed positioning connecting to the lower tonearm assembly.

In one aspect, a horizontal winding post is mounted in a rotary housing, where the housing is able to rotate in a clockwise or counterclockwise direction.

In one aspect, the rotary winding post housing is positioned on the same vertical axis above the lower pivot point bearing, and when rotated creates an anti-skate torque force from the increased twist skew of the filament wire wound on the winding post position relative to the connection to the tonearm assembly below.

In one aspect, the rotary winding post housing is pushed upward by means of an under-mounted spring exerting an upward force on the filament connected to the two crossbar members connected to the lower positioned tonearm assembly.

In one aspect, the horizontal winding post rotation is connected to the lower tonearm assembly and changes the radial axis of the tonearm connecting rod.

In one aspect, the single flexible wire filament is connected to the lower tonearm assembly by two transverse crossbars that are rigidly and perpendicularly connected to the connecting rod.

In one aspect, the change in the radial axis of the tonearm connecting rod will also change the radial axis and azimuth of the cartridge stylus mounted on the outer end of the tonearm assembly.

In one aspect, the tonearm connecting rod is on the same horizontal plane and in longitudinal and parallel alignment with the cartridge stylus tip and record groove.

In one aspect, a single downwardly positioned vertical pivot point bearing is secured by a horizontal armature frame where the frame is mounted to a vertical post fixed to a horizontal base, the pivot point is of tungsten or similarly hard material, and the tungsten pivot point is of sufficient size to transfer detrimental mechanical energy and eliminate potential standing waves generated by cartridge modulation along the tonearm tube.

In one aspect, an internal foam element, or elements, is used to damp mechanical energy and eliminate potential standing waves generated by cartridge modulation along the tonearm tube.

In one aspect, an internal oil-soaked granular material element, or elements, is included to damp mechanical energy and eliminate potential standing waves generated by cartridge modulation along the tonearm tube.

These and other features, aspects, and advantages of the present invention will become better understood with reference to the following description and claims.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

FIG. 7 depicts a perspective view of the tonearm connecting rod with transverse crossbars and tungsten pivot point recess cavity.

FIG. 8A depicts a cross-sectional perspective view of the stylus correctly positioned in the record groove.

DEFINITIONS

The instant invention is most clearly understood with reference to the following definitions.

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term "about."

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

Further terms are defined within the text of the application.

DETAILED DESCRIPTION OF THE INVENTION

The present invention is directed to an improved system for a tonearm with dynamically adjustable azimuth control for playing vinyl phonographic records. Exemplary operational objectives of the tonearm are to rigidly keep the cartridge/stylus in a precise position while allowing frictionless movement of the stylus and tonearm assembly to perfectly track the record groove; transfer detrimental mechanical energy generated by cartridge modulation away from the tonearm assembly; and eliminate any potential standing waves generated by cartridge modulation along the tonearm tube.

Figure 1:
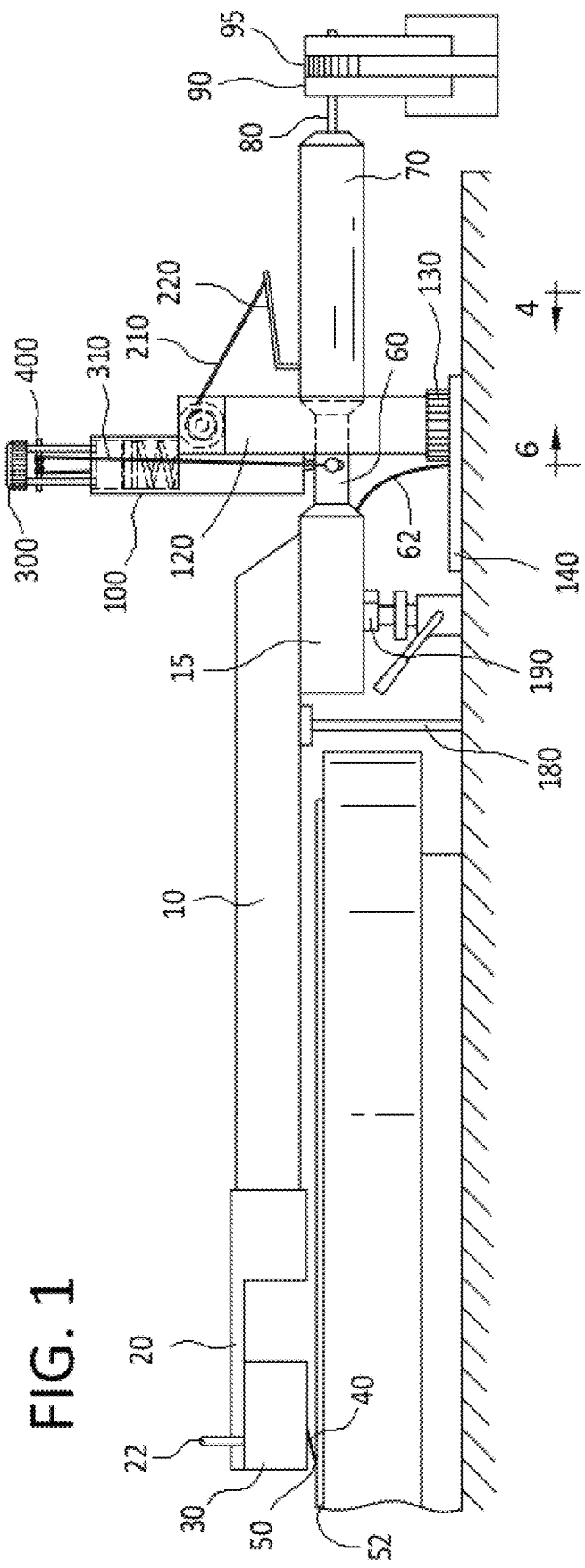
FIG. 1 depicts a perspective side view of the complete tonearm assembly.

Referring to FIG. 1, a tonearm assembly is shown as a side view elevation comprising of an upper tonearm tube 10, lower tonearm tube 15, connecting rod 60, headshell 20, headshell finger lift 22, counterweight tube 70, counterweight 90, rotatable counterweight adjustment wheel 95, and calibration screw 80. The headshell 20 is mounted on and removably connected to the end of upper tonearm tube 10 extending from lower tonearm tube 15 and connecting rod 60. The headshell 20 contains the phonograph cartridge 30, cantilever 40, and stylus 50 that tracks the record groove of the vinyl phonograph record 52. A lower center of gravity counterweight 90 is adjustably attached to counterweight tube 70 via calibration screw 80 and rotatable counterweight adjustment wheel 95 and used to set the vertical tracking force of the stylus 50 in the record groove of vinyl phonograph record 52. Stylus 50 further comprises a tip, the contact point of this stylus tip in record groove 55 is on the same horizontal plane as the tip of a unipivot pin member in a cone-shaped seating recess on connecting rod 60. This same-plane horizontal positioning of the stylus tip and pin member 500 allows for correct and precise azimuth rotational adjustment and calibration.

It is noted that the sole use of filament skew is insufficient to totally eliminate linear displacement, and thus adversely affects the tonearm's overall performance. As an alternative to using skew to fix in place the linear displacement, a rigidly located downward pivot point is positioned as a balance point at the tonearm's center of gravity.

Also shown in FIG. 1 is a headshell finger lift 22 to aid in cuing and positioning stylus 50 above the vinyl phonograph record playing surface. Manual tonearm lifter 190 further includes a control arm for raising and lowering a small vertical lift member, and a horizontally extending support surface attached thereto for raising and lowering the tonearm tube. Arm rest member 180 includes a cradle-shaped end portion having a flap hinged thereto. The flap and cradle end portion form a surround closure around the tonearm tube to secure the tonearm when not in use. In one aspect, the flap and cradle are made of a non-metallic material such as nylon or similar type plastic which will not scratch or mar the surface of tonearm tube.

The signal wire 62 for the tonearm extends from the phonograph cartridge 30 through the inside of upper tonearm tube 10 and lower tonearm tube 15 and exits through an insulated hole in the bottom of lower tonearm tube 15. In one aspect, a lighter 44-gauge litz-type wire may be employed to significantly reduce any potential drag effect on the pivot bearing movement of the tonearm. Signal wire 62 is terminated with suitable male/female electrical interconnection sockets to allow connection to appropriate audio amplification equipment.

Upper tonearm tube 10 is mechanically connected to lower tonearm tube 15. Lower tonearm tube 15 is mechanically connected to connecting rod 60. Connecting rod 60 is mechanically connected to a counterweight tube 70. Decoupled/isolated Counterweight 90 has a lower center of gravity for improved stability and is adjustably connected to counterweight tube 70 by means of calibration screw 80. Counterweight 90 is preferably made of a heavier tungsten material to allow closer positioning of the counterweight 90 to the pivot point seating recess 65 to reduce detrimental tonearm movement inertia. In one aspect, the pivot point is comprised of a tungsten tip or other similar hard material and seats into a very small concave cone-shaped seating recess on the top side surface of the tonearm connecting rod.

In one aspect, the tonearm tubes are made of thin-wall metal tubing material of about 9 mm in diameter with a wall thickness of about 0.25 mm. In another aspect, the tonearm tube material is surface-hardened, anodized, and annealed aluminum, internally damped with lightweight foam rubber inserts placed at specific points within the tonearm tube.

Resonant frequencies resulting from the compliance of cartridge 30, cantilever 40, and the effective mass of the moving parts are controlled by a decoupled lower center of gravity counterweight 90.

A threaded calibration screw 80 adjustably connects counterweight 90 to counterweight tube 70. Turning the calibration screw 80 clockwise or counterclockwise changes the position of counterweight 90 and adjusts the vertical tracking force of the stylus 50 in the record groove 55 (not shown). Fine position adjustment of counterweight 90 can also be accomplished by a rotatable counterweight adjustment wheel 95 connected to calibration screw 80 via a set screw.

Connecting rod 60 is upwardly connected to vertical spring-loaded housing 100 by means of a downward positioned stabilized unipivot bearing.

Vertical spring-loaded housing 100 is transversely connected to horizontal member 110. Horizontal member 110 is connected to vertical support member 120. The vertical support member 120 can be made of a metallic or non-metallic materials. Examples of metallic materials include, but not limited to, aluminum, bronze, and stainless steel. Examples of non-metallic materials include carbon fiber and polymer resin plastics.

The function of vertical support member 120 is to provide a support structure for horizontal member 110. Vertical support member 120 has a rotational vertical tracking angle calibration disk 130 connected to the hard aluminum tonearm base plate 140. By introduction of a set screw to vertical tracking angle calibration disk 130, correct setting can be locked to prevent accidental movement of the vertical tracking angle setting. Vertical support member 120 may include a vernier scale to aid in precise positioning of the support member.

By rotating the vertical tracking angle calibration disk 130 in either the clockwise or counterclockwise direction will cause an internal screw to raise or lower the height of vertical support member 120 relative to the tonearm base plate 140. Changing the height of vertical support member 120 creates an adjustably precise angle of upper tonearm tube 10, lower tonearm tube 15, and connecting rod 60. The vertical adjustment mechanism can be a screw-type mechanism with a set screw to lock the vertical tracking angle height when correctly positioned.

The dynamically adjustable vertical tracking force calibration knob 200 connected to horizontal member 110 rotates to wind filament 210 to create an adjustably precise downforce on stylus 50, cantilever 40, cartridge 30, and headshell 20 by pulling up on spring wire 220 mechanically connected to counterweight tube 70. The dynamically adjustable vertical tracking force calibration knob 200 may contain markings to aid in precise positioning of the knob.

Another property of the stabilized unipivot bearing assembly is the equalization of stylus vertical tracking force when playing warped records. Warps and uneven record surfaces can cause the stylus cantilever to deflect relative to the cartridge body and this may cause the stylus tip to scrub back and forth against the walls of the record groove, resulting in improper frequency modulation of the signal output because the scrubbing action changes the relative velocity between the record groove and the stylus.

The present stabilized unipivot assembly provides that the stylus vertical tracking force is reduced when the tonearm tube responds to an upward warp and is increased when responding to a downward warp. Thus the stylus pressure remains more equal and reduces the undesirable effects of warped records.

The vertical tracking force adjustment mechanism can be finely calibrated with ease while playing a record by rotating the calibration knob 200 to increase or decrease the vertical tracking force of the stylus 50 in record groove 55 (not shown).

The dynamically adjustable anti-skate calibration knob 300 rotates to create a precise twist torsion on filament 310 connected to the lower left and right rigid crossbars 330 and 320 (respectively). The dynamically adjustable anti-skate calibration knob 300 may contain markings to aid in precise positioning of the knob. In one aspect, filament 310 is made of a non-stretch material such as a tungsten wire or tungsten braided wire thread for resistance to oxidation, extreme hardness, and high tensile strength.

Here, when twisting the upwardly positioned housing of winding shaft, the torsion of the filament connected to the two lower crossbars acts to adjust the anti-skate force. The change in position of the housing creates a twist displacement and a skewed torsional position in the filament connection to provide a torque function and compensates for the tangential drag force exerted on the stylus by the rotating record groove. This radially outward skew force opposes the normal inward directed skating force which is induced because the movement of the record past the stylus is not parallel to the line connecting the stylus to the tonearm's pivot point.

A tonearm with an angled/offset headshell will exhibit a tendency to swing inward towards the center of a rotating record. This motion is called skate and is caused by the vectors of the rotational force involved in the stylus overhang (the distance the stylus tip extends beyond the center spindle when the tonearm is positioned directly over the spindle) combined with the offset angle. Anti-skate mechanisms are designed to apply compensatory force to the tonearm to effectively cancel out the natural skating force movement towards the center of the rotating record. In one aspect, an accurate anti-skate mechanism will apply the correct amount of continually changing counterforce across the entire record's play surface without impairing contact groove tracking performance.

The twist torsion anti-skate system provides a variable torque force that is proportional to the position of the tonearm on the vinyl phonograph record playing surface. A given travel distance of the tonearm's unipivot will result in a proportional counterforce as the tonearm sweeps from the outer edge of the vinyl phonograph record playing surface to the center, countering the natural skate force of the stylus 50 tip in record groove 55 and effectively neutralizing the skating effects, keeping the stylus tip in the optimal position for highest performance tracking and signal generation. By increasing the twist torsion on filament 310, a torque differential is created between the lower left and right rigid crossbars 330 and 320 (respectively). This difference in twist torsion produces a torque force directed radially outward toward the outer edge of the record, increasing the anti-skate force. The anti-skate force increases as the stylus position moves toward the center of the record, keeping the stylus 50 in proper position in the record groove and during high modulation passages on the record. The twist torsion anti-skate system can be finely calibrated with ease while playing a record by rotating the calibration knob 300 to increase or decrease the twist torsion on filament 310.

The dynamically adjustable azimuth calibration screw 400 winds filament 310 to precisely adjust the rotational azimuth position of lower rigid crossbars 320 and 330 connected to connecting rod 60. The dynamically adjustable azimuth control system provides a precise and rigid platform in the adjustable rotational azimuth position resulting in improved stereo imaging and soundstage acoustics for replay of vinyl phonographic recordings, thus keeping the stylus tip in the optimal position for highest performance tracking, channel separation, and signal generation.

Figure 2:
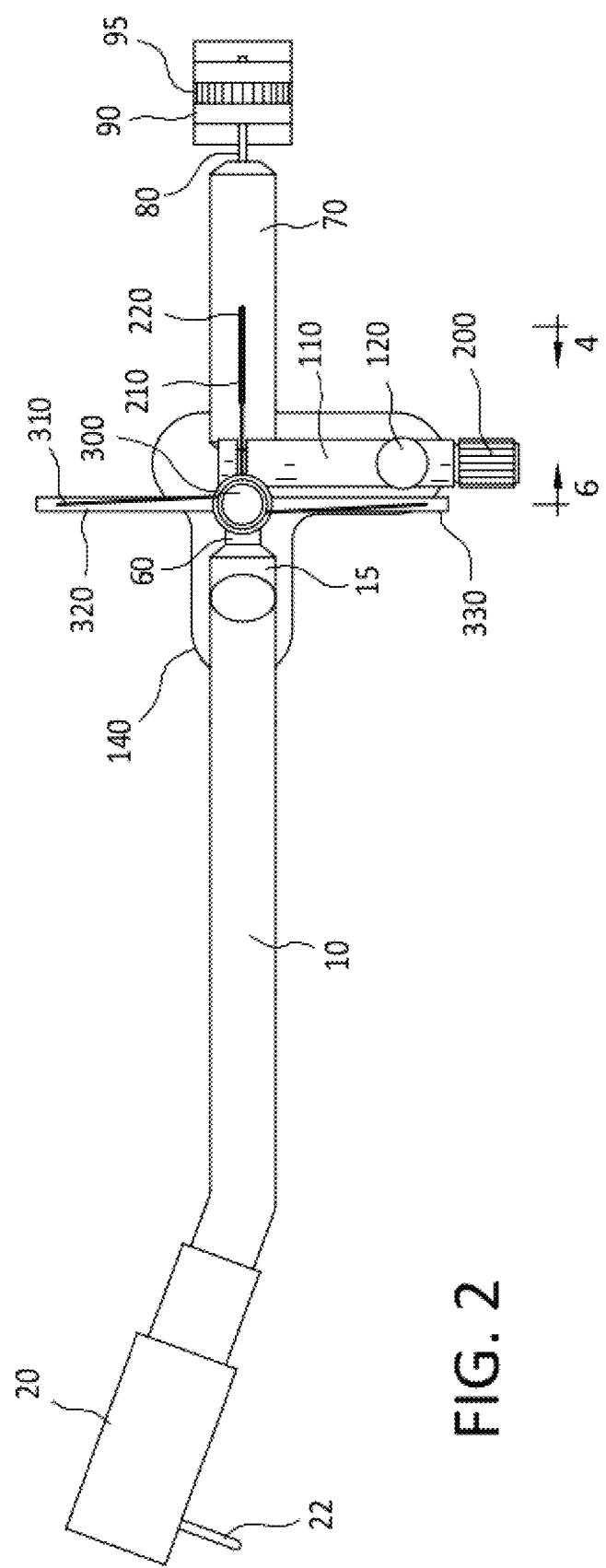
FIG. 2 depicts shows a perspective top view of the complete tonearm assembly.

FIG. 2 shows a top view elevation of the complete tonearm assembly, consisting of upper tonearm tube 10, lower tonearm tube 15, connecting rod 60, headshell 20, headshell finger lift 22, counterweight tube 70, counterweight 90, rotatable counterweight adjustment wheel 95, and calibration screw 80.

The dynamically adjustable vertical tracking force calibration knob 200 is connected to horizontal member 110. Horizontal member 110 is mechanically connected to vertical support member 120. Vertical support member 120 is adjustably connected to tonearm base plate 140.

The dynamically adjustable vertical tracking force calibration knob 200 rotates to wind filament 210 on to winding spool 150 to create an adjustably precise downforce on headshell 20 by pulling up on spring wire 220 mechanically connected to counterweight tube 70.

In a preferred embodiment of the invention, filament 210 is made of a non-stretch material such as a tungsten wire or tungsten braided wire thread for resistance to oxidation, extreme hardness, and high tensile strength.

The dynamically adjustable anti-skate calibration knob 300 rotates to create a precise twist torsion on filament 310 connected to the lower left and right rigid crossbars 330 and 320 (respectively).

Figure 3A:
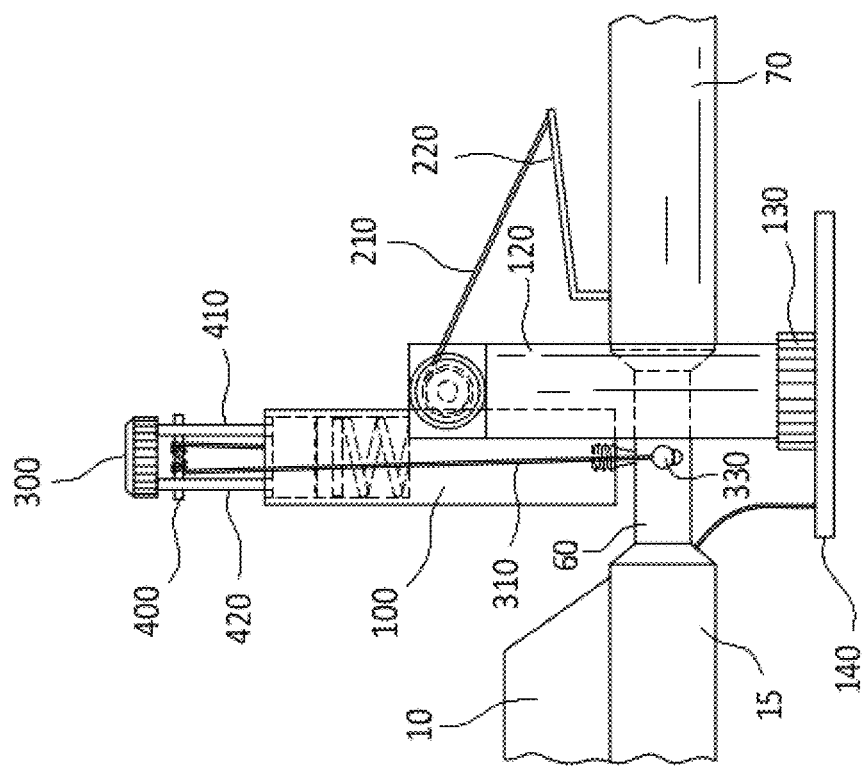
FIG. 3A depicts a left perspective side view of the pivot point bearing, frame, and arm connecting rod.

FIG. 3A shows a left side view elevation of the tonearm's stabilized pivot bearing assembly. Specifically, vertical spring-loaded housing 100, vertical support member 120, vertical tracking angle calibration disk 130, and tonearm base plate 140.

Upper tonearm tube 10, lower tonearm tube 15, connecting rod 60, rigid left crossbar 330, and counterweight tube 70 are upwardly connected to vertical spring-loaded housing 100 by means of a downward positioned stabilized unipivot bearing and filament 310.

The tonearm's stabilized unipivot bearing and damping system provides an ultra low friction bearing (compared to traditional fixed gimbal-type bearings) and superior bearing loading advantages. Combined with fluid damping, the system provides a precise and rigid bearing mechanism in the adjustable rotational azimuth position resulting in improved stereo imaging and soundstage acoustics for replay of vinyl phonographic recordings.

Further tonearm tube resonance damping can be provided by placing inert lightweight foam rubber material (similar to the material used in ear protection products) within upper tonearm tube 10 at specific locations within the tube. When properly positioned, the foam rubber inserts will suppress resonance from being transmitted through the tonearm tube.

If additional tonearm resonance damping is needed, a damped headshell 20 can be employed to dissipate the resonant frequency. The headshell 20 may be fused to upper tonearm tube 10 or may be removably connectable from the upper tonearm tube 10.

From the lower left rigid crossbar 330 (right rigid crossbar 320 not shown) filament 310 is upwardly connected to dynamically adjustable azimuth calibration screw 400.

Dynamically adjustable anti-skate calibration knob 300 and dynamically adjustable azimuth calibration screw 400 are connected to lower front and rear vertical supports 420 and 410, seated in vertical spring-loaded housing 100.

Filament 210 is removably connected to spring wire 220 and spring wire 220 mechanically connected to counterweight tube 70.

Figure 3B:
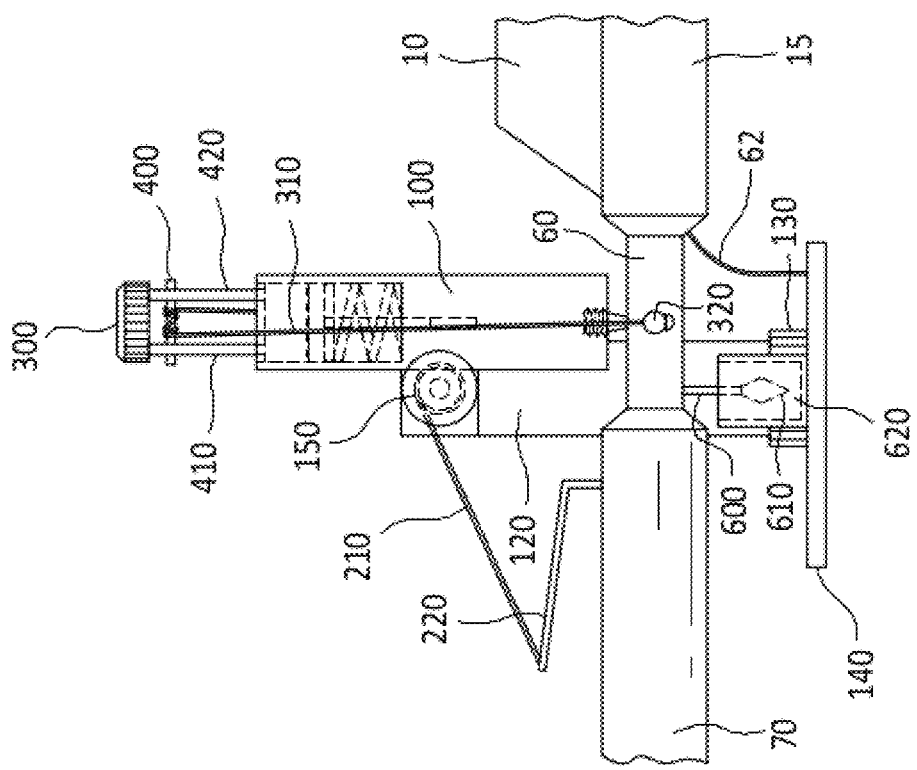
FIG. 3B depicts a right perspective side view of the pivot point bearing, frame, and arm connecting rod.

FIG. 3B shows a right side view elevation of the tonearm pivot bearing assembly.

Specifically, vertical spring-loaded housing 100, vertical support member 120, vertical tracking angle calibration disk 130, and tonearm base plate 140.

Upper tonearm tube 10, lower tonearm tube 15, connecting rod 60, rigid right crossbar 320, and counterweight tube 70 are upwardly connected to vertical spring-loaded housing 100 by means of a downward positioned stabilized unipivot bearing and filament 310. Signal wire 62 exits through an insulated hole in the bottom of lower tonearm tube 15.

Also shown is an optional damping assembly, comprising a damping stem-like member 600, and a paddle-like basal element 610 rigidly connected to connecting rod 60. Basal element 610 is preferably immersed in a bath 620 of viscous damping fluid similar to commercial silicone fluid of approximately 100,000 centistokes viscosity.

From the lower right rigid crossbar 320 (left rigid crossbar 330 not shown) filament 310 is upwardly connected to dynamically adjustable azimuth calibration screw 400.

Dynamically adjustable anti-skate calibration knob 300 and dynamically adjustable azimuth calibration screw 400 are connected to lower front and rear vertical supports 420 and 410, seated in vertical spring-loaded housing 100.

Filament 210 is removably connected to winding spool 150 to create an adjustably precise downforce on the stylus 50, cantilever 40, cartridge 30, and headshell 20 (stylus 50, cantilever 40, cartridge 30, and headshell 20 not show) by pulling up on spring wire 220 mechanically connected to counterweight tube 70.

Figure 4:
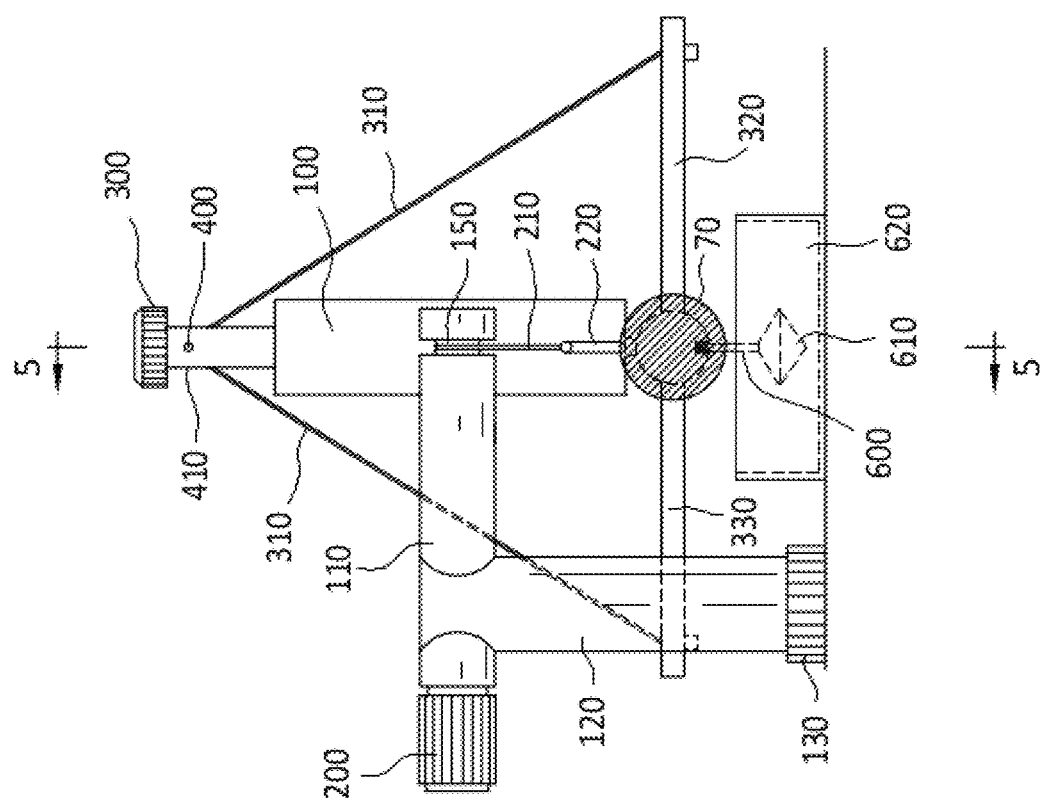
FIG. 4 depicts a perspective rear view of the pivot point bearing, frame, perpendicular crossbars, and arm connecting rod.

FIG. 4 shows a rear view elevation of the tonearm's stabilized unipivot bearing assembly.

Specifically, vertical support member 120, vertical tracking angle calibration disk 130, vertical spring-loaded housing 100, dynamically adjustable vertical tracking force calibration knob 200, horizontal member 110, winding spool 150, filament 210, spring wire 220, counterweight tube 70, filament 310, lower left and right rigid crossbars 330 and 320 (respectively), dynamically adjustable anti-skate calibration knob 300, dynamically adjustable azimuth calibration screw 400, and rear vertical support 410.

Vertical support member 120 has a lower positioned rotational vertical tracking angle calibration disk 130. The dynamically adjustable vertical tracking angle calibration disk 130 rotates to raise or lower the height of vertical support member 120. Changing the height of vertical support member 120 creates an adjustably precise angle of upper tonearm tube 10, lower tonearm tube 15, and connecting rod 60 (upper tonearm tube 10, lower tonearm tube 15, and connecting rod 60 not shown).

The dynamically adjustable vertical tracking force calibration knob 200 is connected to winding spool 150 via horizontal member 110. Filament 210 is removably connected to winding spool 150 and spring wire 220.

Rotating the dynamically adjustable vertical tracking force calibration knob 200 and winding spool 150 changes the tension of filament 210 to create an adjustably precise downforce on stylus 50, cantilever 40, cartridge 30, and headshell 20 (stylus 50, cantilever 40, cartridge 30, and headshell 20 not shown) by pulling up on spring wire 220 mechanically connected to counterweight tube 70.

Also shown is an optional damping assembly, comprising a damping stem-like member 600, and a paddle-like basal element 610 rigidly connected to connecting rod 60. Basal element 610 is preferably immersed in a bath 620 of viscous damping fluid similar to commercial silicone fluid of approximately 100,000 centistokes viscosity.

The dynamically adjustable anti-skate calibration knob 300 rotates to create a precise twist torsion on filament 310 connected to the lower left and right rigid crossbars 330 and 320 (respectively).

The dynamically adjustable azimuth calibration screw 400 winds filament 310 to precisely adjust the rotational azimuth position of lower rigid crossbars 320 and 330 connected to connecting rod 60 (connecting rod 60 not shown).

Left and right rigid crossbars 330 and 320 (respectively) are upwardly connected to vertical spring-loaded housing 100 by means of a downward positioned stabilized unipivot bearing and filament 310.

From the lower left and right rigid crossbars 330 and 320 (respectively), filament 310 is upwardly connected to dynamically adjustable azimuth calibration screw 400.

Dynamically adjustable anti-skate calibration knob 300 and dynamically adjustable azimuth calibration screw 400 are connected to lower front and rear vertical supports 420 and 410 (vertical support 420 not shown), and seated in vertical spring-loaded housing 100.

Figure 5:
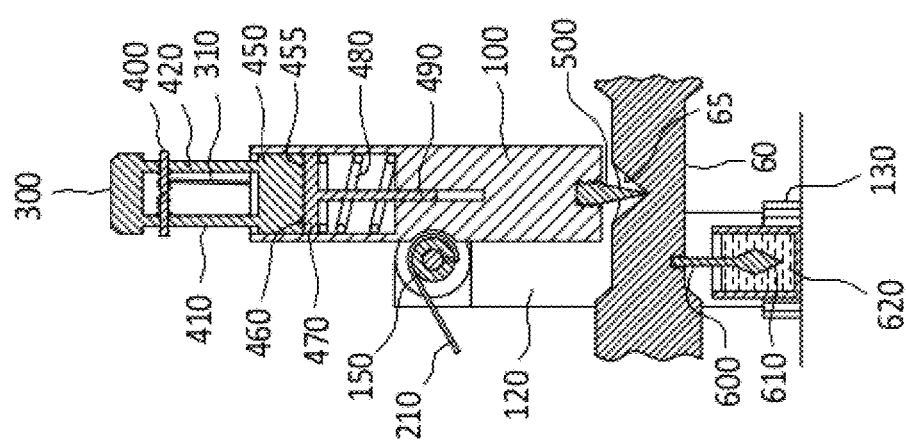
FIG. 5 depicts a cutaway side view of the winding post housing with filament.

Turning now to FIG. 5, a right side cross-section elevation of the stabilized unipivot bearing assembly is shown. Specifically, vertical support member 120 has a lower positioned rotational vertical tracking angle calibration disk 130. The dynamically adjustable vertical tracking angle calibration disk 130 rotates clockwise or counterclockwise to raise or lower the height of vertical support member 120. Changing the height of vertical support member 120 creates an adjustably precise angle of upper tonearm tube 10, lower tonearm tube 15, and connecting rod 60 (upper and lower tonearm tubes 10 and 15 not shown).

The vertical spring-loaded housing 100 supports the tonearm assembly by means of a threaded inverted pivot pin member 500 to allow frictionless bearing travel movement through the horizontal playing surface of the record and vertical travel when tracking warps and uneven vinyl phonograph record surfaces. The vertical spring-loaded housing 100 is transversely connected to horizontal member 110. Horizontal member 110 is connected to vertical support member 120. Vertical spring-loaded housing 100 contains the dynamically adjustable anti-skate calibration knob 300, dynamically adjustable azimuth calibration screw 400, front and rear vertical supports 420 and 410 (respectively), lower base plate of dynamically adjustable anti-skate vertical supports 450, rotary indexing plate 470, and tension spring 480.

A square rod basal element 490 is rigidly connected to the bottom of rotary indexing plate 470 and extends downward. The square rod basal element 490 is keyed to a square recess vertical channel in the vertical spring-loaded housing 100 to prevent rotational movement of rotary indexing plate 470 and allow vertical travel when tension spring 480 is compressed.

Also shown is an optional damping assembly, comprising a damping stem-like member 600, and a paddle-like basal element 610 rigidly connected to connecting rod 60. Basal element 610 is preferably immersed in a bath 620 of viscous damping fluid similar to commercial silicone fluid of approximately 100,000 centistokes viscosity.

Rotating the dynamically adjustable vertical tracking force calibration knob 200 (dynamically adjustable vertical tracking force calibration knob 200 not shown) connected to winding spool 150 changes the tension of filament 210 to create an adjustably precise downforce on stylus 50, cantilever 40, cartridge 30, and headshell 20 (stylus 50, cantilever 40, cartridge 30, and headshell 20 not shown) by pulling up on spring wire 220 mechanically connected to counterweight tube 70 (spring wire 220 and counterweight tube 70 not shown).

Dynamically adjustable anti-skate calibration knob 300 and dynamically adjustable azimuth calibration screw 400 are connected to lower front and rear vertical supports 420 and 410 (vertical support 420 not shown), and seated in vertical spring-loaded housing 100.

The dynamically adjustable anti-skate calibration knob 300 rotates to create a precise twist torsion on filament 310 connected to the lower left and right rigid crossbars 330 and 320 (lower left and right rigid crossbars 330 and 320 not shown). Precise anti-skate rotational adjustment setting is provided by rotary surface indents 455 of lower base plate of dynamically adjustable anti-skate vertical supports 450 and rotary surface indents 455 of lower base plate of dynamically adjustable anti-skate vertical supports comes into frictional contact and pressed against rotary raised indexing tooth 460 of lower positioned rotary indexing plate 470 by upward pressure from lower tension spring 480.

A square rod basal element 490 is rigidly connected to the bottom of rotary indexing plate 470 and extends downward. The square rod basal element 490 is keyed to a square recess vertical channel in the vertical spring-loaded housing 100 to prevent rotational movement of rotary indexing plate 470 and allow vertical travel when tension spring 480 is compressed.

The dynamically adjustable azimuth calibration screw 400 winds filament 310 to precisely adjust the rotational azimuth position of lower rigid crossbars 320 and 330 (lower rigid crossbars 320 and 330 not shown) connected to connecting rod 60. Left and right rigid crossbars 330 and 320 (respectively) are upwardly connected to vertical spring-loaded housing 100 by means of filament 310 and downward positioned pivot pin member 500 positioned in cone-shaped seating recess 65. In a preferred embodiment of the present invention, both the pivot pin member 500 and connecting rod 60 with the cone-shaped seating recess 65 are formed of an extremely hard material such as tungsten carbide, thereby allowing the stabilized unipivot bearing assembly to be polished to a smoothness comparable to that of sapphire but with increased load and shock capacity.

A heavy-weight silicone-type viscous damping fluid of approximately 100,000 centistokes viscosity is introduced into the cone-shaped seating recess 65 to reduce the friction between the engaging surfaces of the pivot pin member 500 and the cone-shaped seating recess 65 by forming a thin protective film of lubricant in between the contacting surfaces.

Figure 6:
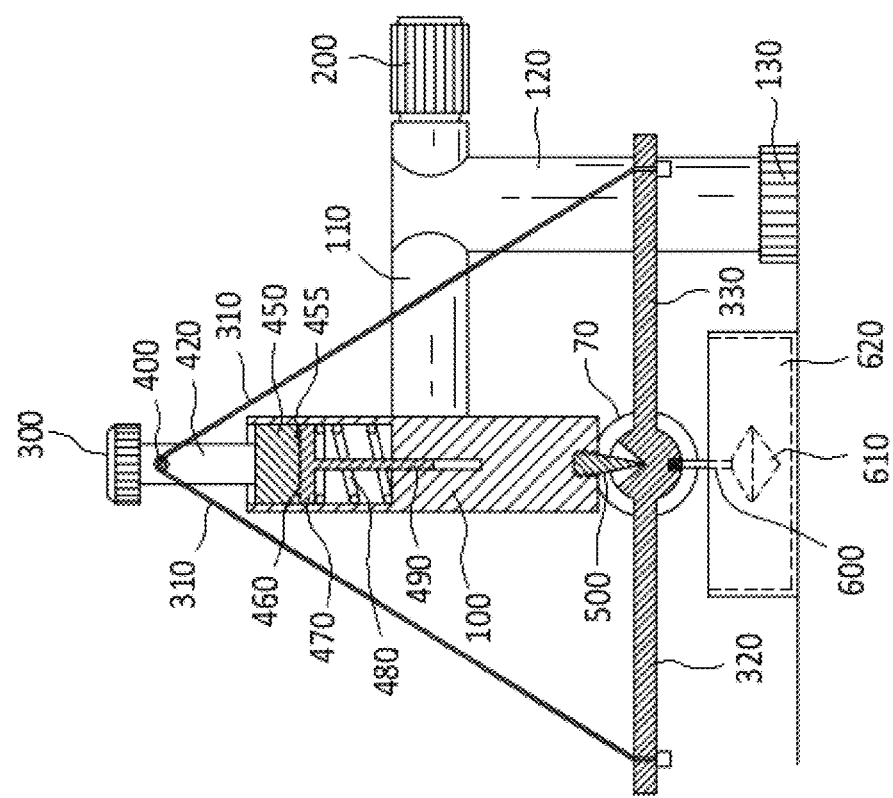
FIG. 6 depicts a front cutaway view of the winding post housing with filament connected to the lower crossbars.

FIG. 6 shows a cross-section front elevation of the tonearm's stabilized unipivot bearing assembly. Specifically, vertical support member 120, vertical tracking angle calibration disk 130, vertical spring-loaded housing 100, horizontal member 110, dynamically adjustable vertical tracking force calibration knob 200, connecting rod 60, cone-shaped seating recess 65, pivot pin member 500, dynamically adjustable anti-skate calibration knob 300, dynamically adjustable azimuth calibration screw 400, front vertical support 420, lower base plate of dynamically adjustable anti-skate vertical supports 450, rotary surface indents 455 of lower base plate of dynamically adjustable anti-skate vertical supports, rotary raised indexing tooth 460, rotary indexing plate 470, tension spring 480, square post 490, counterweight tube 70, filament 310, and lower left and right rigid crossbars 330 and 320 (respectively).

Vertical support member 120 has a lower positioned rotational vertical tracking angle calibration disk 130. The dynamically adjustable vertical tracking angle calibration disk 130 rotates clockwise or counterclockwise to raise or lower the height of vertical support member 120. Changing the height of vertical support member 120 creates an adjustably precise angle of upper tonearm tube 10, lower tonearm tube 15, and connecting rod 60 (upper tonearm tube 10, lower tonearm tube 15, and connecting rod 60 not shown).

Also shown is an optional damping assembly, comprising a damping stem-like member 600, and a paddle-like basal element 610 rigidly connected to connecting rod 60. Basal element 610 is preferably immersed in a bath 620 of viscous damping fluid similar to commercial silicone fluid of approximately 100,000 centistokes viscosity.

The dynamically adjustable azimuth calibration screw 400 winds filament 310 to precisely adjust the rotational azimuth position of lower left and right rigid crossbars 330 and 320 (respectively) connected to connecting rod 60. A cone-shaped seating recess 65 is positioned on top of connecting rod 60 to accept downward positioned pivot pin member 500.

The dynamically adjustable anti-skate calibration knob 300 rotates to create a precise twist torsion on filament 310 connected to the lower left and right rigid crossbars 330 and 320 (respectively). Precise anti-skate rotational adjustment twist torsion is provided by rotary surface indents 455 of lower base plate of dynamically adjustable anti-skate vertical supports 450 and rotary surface indents 455 of lower base plate of dynamically adjustable anti-skate vertical supports pressed in frictional contact against rotary raised indexing tooth 460 of rotary indexing plate 470 by upward pressure from lower tension spring 480.

A square rod basal element 490 is rigidly connected to the bottom of rotary indexing plate 470 and extends downward. The square rod basal element 490 is keyed to a square recess vertical channel in the vertical spring-loaded housing 100 to prevent rotational movement of rotary indexing plate 470 and allow vertical travel when tension spring 480 is compressed.

Dynamically adjustable anti-skate calibration knob 300 and dynamically adjustable azimuth calibration screw 400 are connected to lower front and rear vertical supports 420 and 410 (vertical support 410 not shown), and seated in vertical spring-loaded housing 100.

FIG. 7 shows a perspective close-up elevation of connecting rod 60 and crossbars 320 and 330 with cone-shaped seating recess 65 for pivot pin member 500 (pivot pin member 500 not shown). Also shown is optional damping assembly, comprising a damping stem-like member 600, and a paddle-like basal element 610 rigidly connected to connecting rod 60. In one aspect, basal element 610 is immersed in a bath 620 of viscous damping fluid similar to commercial silicone fluid of approximately 100,000 centistokes viscosity.

Horizontal movement of cartridge 30 laterally moves basal element 610 and vertical movement of cartridge 30 tilts basal element 610. The ratio of the lateral to tilt damping constant depends of the shape and the surface area of basal element 610. A more substantial basal element will provide a desirable lower ratio than a smaller basal element. The optimal damping characteristics will depend and vary with the actual stylus and cantilever compliance.

Figure 8B:
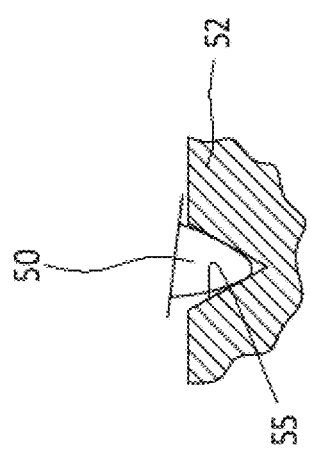
FIG. 8B depicts a cross-sectional perspective view of the stylus incorrectly positioned in the record groove.

FIG. 8A shows a cross-section elevation of stylus 50 correctly positioned in phonograph record groove 55 of record 52 with correct azimuth setting. A correct azimuth setting results in improved stereo imaging and soundstage acoustics for replay of vinyl phonographic recordings FIG. 8B shows a cross-section elevation of stylus 50 incorrectly positioned in phonograph record groove 55 of record 52 with incorrect azimuth setting. An incorrect azimuth setting results in poor stereo imaging and soundstage acoustics and can damage the groove surface of a vinyl phonograph record.

Figure 9:
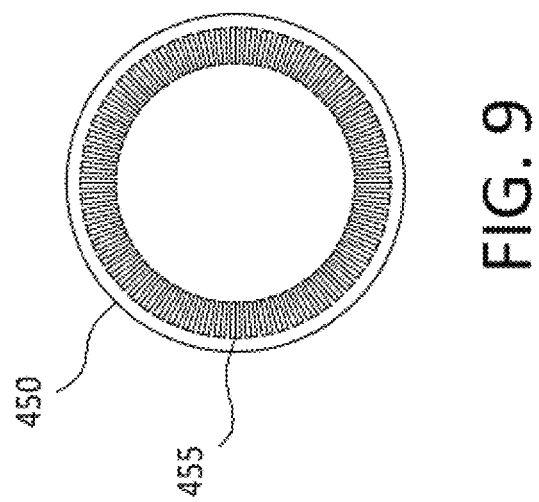
FIG. 9 depicts the anti-skate lower rotary detent plate with 60 radial grooves.

FIG. 9 shows a perspective view of lower base plate of dynamically adjustable anti-skate vertical supports 450 and precise anti-skate rotational adjustment rotary surface indents 455.

Figure 10:
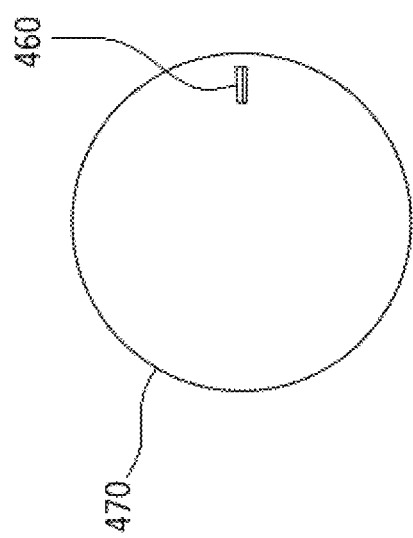
FIG. 10 depicts show the opposing anti-skate upper rotary detent plate with a single raised tooth.

FIG. 10 shows a surface elevation of rotary indexing plate 470 and rotary raised indexing tooth 460.

Once the tonearm assembly is correctly positioned and installed on the turntable, the tonearm assembly can be set and calibrated. If this tonearm assembly is installed as an aftermarket upgrade and replaces the original tonearm, the same calibration setting procedure is to be used and is as follows.

These calibration settings include four interrelated mechanisms: vertical tracking force, vertical tracking angle, anti-skate, and azimuth. When these four mechanisms are optimized relative to each other, the result is very accurate record groove tracking performance. Calibration of the vertical tracking force is specific to the recommended weight range given by the cartridge manufacturer. This setting is usually calibrated first. The vertical tracking angle is calibrated by raising or lowering the tonearm assembly pivot point. Most tonearm assemblies use a zero vertical tracking angle so the tonearm is completely horizontal and parallel to the record groove surface area. Calibrating the anti-skate setting is usually proportional to the vertical tracking force setting. In practice, heavier vertical tracking forces require more anti-skate compensatory calibration. When the above three calibration settings have been made, the azimuth setting can be calibrated and optimized. Beginning with an azimuth setting that is visually perpendicular to the record playing surface and confirmed by using an electronic signal test record for maximum stereo channel separation, dynamic optimization adjustment can be done as a last step to audibly confirm the that the azimuth calibration is set for maximum performance for critical evaluation of phonographic vinyl recordings.

Having described the invention with regard to specific embodiments, it is to be understood that the description is not meant as a limitation since further embodiments, modifications, and variations may be apparent or may suggest themselves to those skilled in the art. It is intended that the present application cover all such embodiments, modifications, and variations. Further embodiments, advantages, and features of the invention will become apparent in conjunction with the drawings and detailed disclosure herein.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

What is claimed is:

1. A device comprising:
an upper tonearm tube,
a lower tonearm tube,
a connecting rod,
a headshell,
a headshell finger lift,
a counterweight tube, and
a counterweight;
wherein said headshell is mounted on and removably connected to an end of said upper tonearm tube, said upper tonearm tube extending from said lower tonearm tube and said connecting rod;
wherein said headshell contains a phonograph cartridge, a cantilever, and a stylus;
wherein said counterweight is adjustably attached to said counterweight tube and sets the vertical tracking force of said stylus in a record groove of a vinyl phonograph record;
wherein said stylus further comprises a stylus tip, said stylus tip further comprising a contact point, and wherein said contact point of said stylus tip contacts a record groove on the same horizontal plane as a tip of a unipivot pin member in a cone-shaped seating recess on said connecting rod;
wherein said upper tonearm tube is mechanically connected to said lower tonearm tube, said lower tonearm tube is mechanically connected to said connecting rod, and said connecting rod is mechanically connected to said counterweight tube; and a
a single filament, wherein said single filament is wound around an upwardly positioned horizontal winding shaft and housing, and said housing is pushed upward by means of a lower positioned internal spring;
wherein each end of said single filament is attached to the outer sides of a right and a left lower transverse crossbar;
wherein the right and left transverse crossbars are rigidly and perpendicularly connected to said tonearm at a single, rigid pivot point allowing for complete vertical and horizontal freedom of travel.

2. The device of claim 1, further comprising:
the headshell finger lift, wherein said headshell finger lift aids in cuing and positioning said stylus above a phonograph record playing surface.

3. The device of claim 1, further comprising:
a signal wire, wherein said signal wire extends from the phonograph cartridge, through an inside of said upper tonearm tube and said lower tonearm tube, and exits through an insulated hole in a bottom of said lower tonearm tube.

4. The device of claim 1, wherein a threaded calibration screw adjustably connects said counterweight to said counterweight tube.

5. The device of claim 1, further comprising:
a vertical spring-loaded housing, wherein said connecting rod is upwardly connected to said vertical spring-loaded housing by said unipivot pin member and said vertical spring-loaded housing is transversely connected to a horizontal member; and
wherein said horizontal member is connected to a vertical support member.

6. The device of claim 5, said vertical support member further comprising a rotational vertical tracking angle calibration disk;
wherein said rotational vertical tracking angle calibration disk is connected to a tonearm base plate.

7. The device of claim 6, wherein rotating said vertical tracking angle calibration disk in either the clockwise or counterclockwise direction will cause an internal screw to raise or lower the height of said vertical support member relative to said tonearm base plate.

8. A dynamically adjustable azimuth control mechanism for accurate adjustment of a tonearm setting for a cartridge stylus, wherein azimuth is a perpendicular position of said cartridge stylus to a vinyl phonograph record groove, said mechanism comprising:
a phonograph tonearm apparatus, said tonearm apparatus comprising a single filament mechanism, a pivot pin supporting a tonearm assembly, and a pivot point;
said single filament mechanism including a single filament that is wound around an upwardly positioned horizontal winding shaft and has opposite ends respectively connected to rigid crossbars extending from a tonearm;
wherein said single filament mechanism dynamically adjusts the azimuth of the cartridge stylus in real-time during playback of a vinyl record while keeping the pivot point in a fixed frictionless position.

9. The mechanism of claim 8 further comprising an anti-skate control mechanism, wherein said anti-skate control mechanism provides dynamic adjustment in real-time during playback of vinyl phonograph records.

10. The mechanism of claim 9,
wherein the single filament is wound around the upwardly positioned horizontal winding shaft and a housing;
wherein said shaft and housing is pushed upward by means of a lower positioned internal spring damped in a heavy-weight silicone-type fluid, and where the upward force of said lower positioned internal spring creates tension, keeping said tonearm apparatus upwardly connected to said pivot point.

11. The mechanism of claim 10,
said filament comprising two ends and the crossbars comprising a right lower transverse cross bar and a left lower transverse crossbar, wherein each end is attached to one of an outer side of a said right lower transverse crossbar and said left lower transverse crossbar;

wherein each of said transverse crossbars are rigidly and perpendicularly connected to said tonearm apparatus at said pivot point allowing for vertical and horizontal freedom of travel.

12. The mechanism of claim 8 wherein said phonograph tonearm apparatus further includes a heavy-weight silicone-type fluid in which the single filament mechanism is supported.

13. The mechanism of claim 8 wherein said single filament mechanism comprises a tungsten wire.

* * * * *